UNITED STATES PATENT OFFICE.

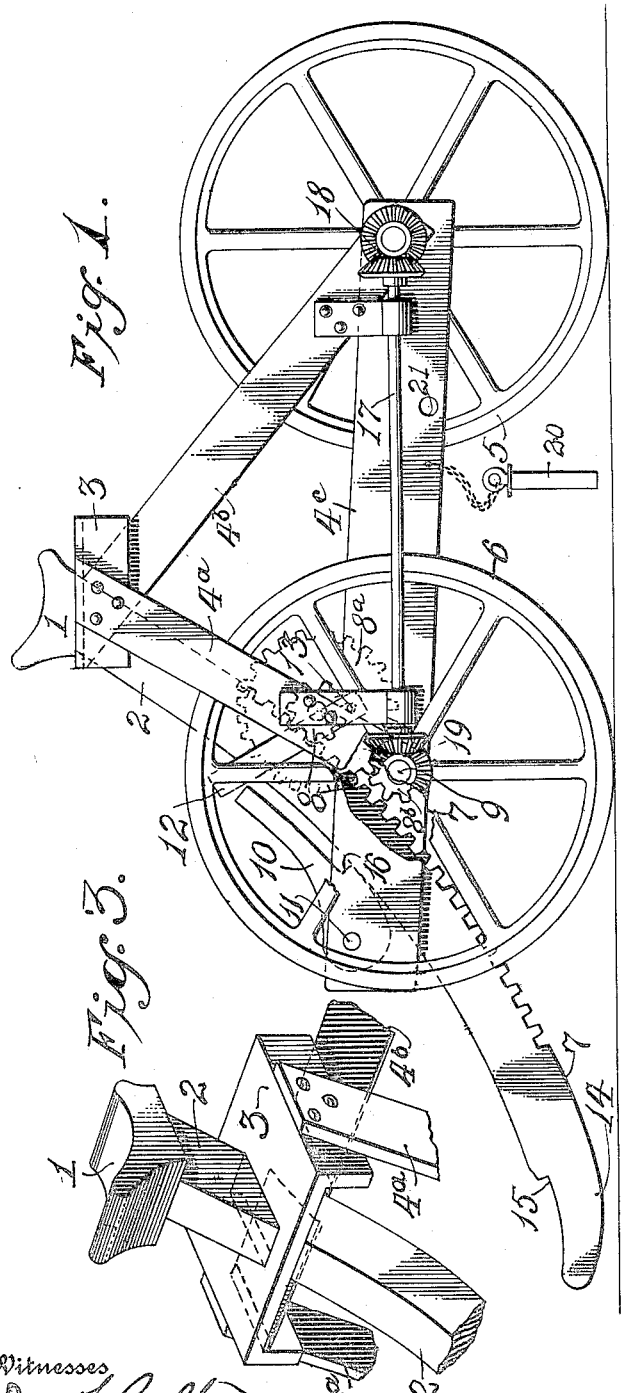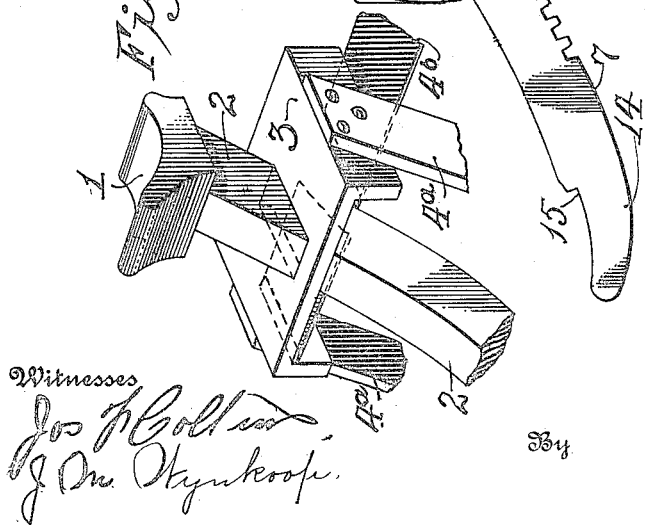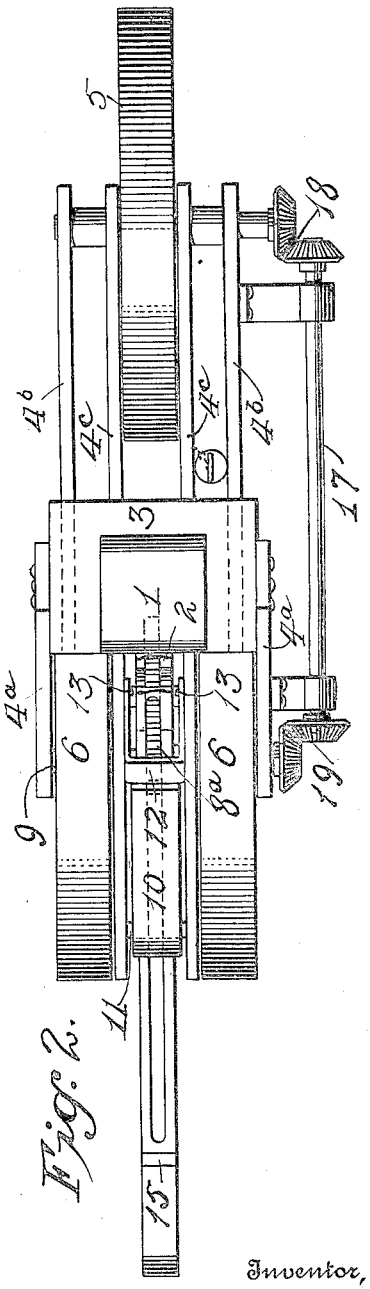

CLYDE N. FRIZ, OF BALTIMORE, MARYLAND.

AUTOMATIC VEHICLE-JACK.

1,037,610.  Specification of Letters Patent.  Patented Sept. 3, 1912.

Application filed March 13, 1912. Serial No. 683,561.

*To all whom it may concern:*

Be it known that I, CLYDE N. FRIZ, a citizen of the United States, residing in the city of Baltimore and State of Maryland, have invented certain new and useful Improvements in Automatic Vehicle-Jacks, of which the following is a specification.

This invention relates to a means for relieving a vehicle wheel of its load, temporarily, as when it may be necessary to remove the wheel from the vehicle or restore or adjust some part thereof; or when it may be desired to permit the vehicle to travel without imposing a load upon the wheel.

One object of the invention is to cause the device to act automatically in developing the elevating movement when the device is applied to some part of the vehicle (preferably the axle carrying the wheel to be relieved), and particularly to develop this elevating movement from a progression or travel of the vehicle with the jack, so that the jack will be particularly convenient in jacking up a wheel of a heavy self-propelled vehicle.

Further objects relate to development of a simple, durable and easily applied device capable of accomplishing the aforesaid principal object; also to adapt the device to automatically discontinue the elevating movement after a sufficient elevation has been accomplished, even though the progress of the vehicle with the device may not be immediately arrested at the end of the elevating movement; also to adapt the device to sustain a wheel in elevated position and to travel with the vehicle indefinitely, as when it may be desired to reach a distant point, with the vehicle, with the elevated wheel out of use.

The invention comprises a lifting member, means for imparting elevating movement to the lifting member, and ground wheels upon which the device may travel with the vehicle, when applied thereto, there being also suitable means for automatically actuating the elevating mechanism when the vehicle progresses over the surface; such means preferably comprising a driving connection between the ground wheels of the jack and the elevating mechanism.

The invention will be fully understood upon reference to the accompanying drawing, in which—

Figure 1 is a side elevation, and Fig. 2 a top plan view of an illustrative embodiment of the features of my invention. Fig. 3 shows a detail.

1 represents a saddle-like support constructed to receive a portion of a vehicle, as for instance an axle thereof. 2 represents an elevating bar carrying said support and preferably constructed in the form of a segment in order to provide for sufficient length of the bar and to change the angle of the concave bearing face of the saddle 1, so as to better retain its engagement with the axle resting therein, and insure travel of the jack with the vehicle. The bar 2 is supported in a guide 3 mounted upon the frame 4 of the jack, which is in turn supported by the front and rear ground wheels 5, 6, of which there are preferably two of the latter to sustain the jack against tipping sidewise, and one of the former. Said bar is provided with rack teeth 7 that mesh with a pinion 8 meshing through reducing gear-wheel 8ª, with a pinion 8ᵇ, which, together with the wheels 6, is fast upon the axle 9 of said wheels and is located between them. A confining rest 10, pivoted at 11, on the frame member 4ᶜ is adapted to swing into position to hold the rack 2 in engagement with the pinion 8, said rest being secured in said holding position by the keeper 12, which is pivoted at 13 on said frame member.

When the jack is applied to the axle of a heavy self-propelled vehicle, and the latter is caused to progress over the surface under its own power, or otherwise, the ground wheels 6 of the jack will cause rotation of the pinion 8 in the direction to thrust the bar 2 upward and gradually raise the adjacent vehicle wheel from the ground. When elevation has been developed by the full length of the rack bar traversing the pinion 8, the teeth of the pinion reach the deflecting surface 14 of the bar 2 at the same time that the offset 15 on the opposite side of said bar, coincides with the shoulder 16 on the rest 10, with the result that the elevating bar is locked against retrograde motion under the load which it is sustaining and continued movement of the jack with the vehicle will be without effect, thus avoiding the necessity of guarding against an over-travel of the jack or injury to the apparatus resulting from failure to arrest the progress at the proper moment. With the provision of suitable means for fixing the jack against dislodgment by uneven roadways, the vehicle might well be continued to any remote point, without imposing load upon the relieved wheel.

When it is desired to restore the relieved wheel to its position upon the surface, the keeper 12 is swung upwardly to release the rest 10, which may then swing outwardly to withdraw the shoulder 16 from the offset 15 and permit the rack bar to return to its engagement with the pinion 8. The rest 10 may then be returned to position to keep the rack bar into engagement with the pinion and the vehicle caused to run backward until the elevated wheel is restored to the surface, when the jack can be removed.

In order to insure sufficient traction for the purpose of operating the elevating bar, the wheels 5 and 6 may be coupled in driving relation to each other by any suitable means, such for instance as a shaft 17 connected with the axles of said wheels by beveled gears 18, 19.

To prevent undesired travel of the jack due to uneven surface a chocking pin 20 may be inserted through socket 21 into the path of the wheel spokes of one of the wheels.

For convenience in stowing away the jack, the saddle support 1 with the rack bar 2 may readily be withdrawn from its mounting, after the rest 10 has been thrown over out of confining relation to the bar.

Any suitable means may be employed for firmly guying or staying the jack relatively to the vehicle axle in order to maintain its straight fore-and-aft position for protracted travel beyond the extent merely necessary to develop the elevation of the axle.

I claim:—

1. In a vehicle jack, a lifting member constructed to engage with a part of a vehicle to be elevated and mounted to be capable of elevating movement, a driving means for imparting such elevating movement to the lifting member, and a traction wheel having connections through which it actuates said driving means.

2. A lifting jack having ground wheels through which it is adapted to travel with the vehicle, a lifting member constructed to engage with a part of a vehicle to be lifted and mounted on said jack, a driving member adapted to impart elevating movement to said lifting member, and actuating connection between a ground wheel and said driving member.

3. A vehicle jack comprising a rack bar constructed to engage with a part of a vehicle to be lifted and adapted to impart elevating movement thereto, a driving pinion engaging said rack bar, and a traction wheel having actuating connection with said pinion.

4. A vehicle jack comprising a rack bar adapted to impart elevating movement, a driving pinion engaging said rack bar, a traction wheel having actuating connection with said pinion, and a releasable rest for holding said rack in driven relation to the pinion.

5. A vehicle jack comprising a rack bar adapted to impart elevating movement, a driving pinion engaging said rack bar, a traction wheel having actuating connection with said pinion, and a releasable rest for holding said rack in driven relation to the pinion; said rest and rack bar being provided the one with a shoulder and the other with an offset adapted to inter-engage and prevent retrograde movement of the rack bar at the end of its elevating movement.

6. A vehicle jack comprising a rack bar adapted to impart elevating movement, a driving pinion engaging said rack bar, a traction wheel having actuating connection with said pinion, and a releasable rest for holding said rack in driven relation to the pinion; said rest and rack bar being provided the one with a shoulder and the other with an offset adapted to inter-engage and prevent retrograde movement of the rack bar at the end of its elevating movement; and said rack bar having a deflecting surface engaged by the pinion for forcing the rack bar into engagement with the rest.

7. A vehicle jack comprising a rack bar adapted to impart elevating movement, a driving pinion engaging said rack bar, a traction wheel having actuating connection with said pinion, and a releasable rest for holding said rack in driven relation to the pinion; said rest and rack bar being provided the one with a shoulder and the other with an offset adapted to inter-engage and prevent retrograde movement of the rack bar at the end of its elevating movement, and there being a releasable keeper for said rest.

8. A vehicle jack comprising a plurality of ground wheels whereby the jack is adapted to travel with a vehicle to be jacked; an elevating bar constructed to engage with a part of a vehicle to be elevated and to establish driving connection between the vehicle and the wheeled jack; driving means for said elevating bar, and means through which said driving means are actuated by a plurality of the ground wheels.

9. A vehicle jack comprising an elevating bar, a driving means for said elevating bar, front and rear ground wheels upon which said jack rests, a connection between said wheels forcing them to rotate together, and an actuating connection between one of said wheels and the driving means of the elevating bar.

10. A vehicle jack comprising a suitable frame, a traction wheel upon which said frame is mounted, a driving means actuated by said traction wheel, and an elevating bar actuated by said driving means; said elevating bar constructed to engage with a part of a vehicle to be elevated and being removably mounted in said frame.

CLYDE N. FRIZ.

In presence of—
 CHARLES M. KEYSER, Jr.,
 GEORGE SCHMIDT.

Copies of this patent may be obtained for five cents each, by addressing the "Commissioner of Patents, Washington, D. C."